United States Patent [19]
Barnes

[11] 3,901,004
[45] Aug. 26, 1975

[54] ROTARY MOWERS

[76] Inventor: Stephen John Barnes, 35 Haydon St., Palmerston North, New Zealand

[22] Filed: Nov. 29, 1973

[21] Appl. No.: 419,976

Related U.S. Application Data

[63] Continuation-in-part of Ser. No. 265,698, June 23, 1972, abandoned.

[52] U.S. Cl. .................. 56/17.3; 56/10.4; 56/15.7
[51] Int. Cl.² ........................................ A01D 35/12
[58] Field of Search ............ 56/6, 13.4, 15, 7, 10.4, 56/10.7, 17.1, 17.3, 235, 255

[56] References Cited
UNITED STATES PATENTS

| | | | |
|---|---|---|---|
| 2,481,798 | 9/1949 | Turner et al. | 56/17.1 |
| 2,669,826 | 2/1954 | Watrous | 56/13.4 |
| 2,707,363 | 5/1955 | Beranek et al. | 56/17.1 |
| 2,711,064 | 6/1955 | Parker, Sr. | 56/17.3 |
| 2,791,081 | 5/1957 | Allen et al. | 56/15.7 |
| 2,953,888 | 9/1960 | Phillips, Jr. et al. | 56/13.4 |
| 3,087,296 | 4/1963 | Cowles | 56/10.7 |
| 3,545,184 | 12/1970 | Liepold et al. | 56/6 |

FOREIGN PATENTS OR APPLICATIONS

| | | | |
|---|---|---|---|
| 790,254 | 2/1958 | United Kingdom | 56/235 |
| 272,350 | 1/1965 | Australia | 56/255 |

*Primary Examiner*—Russell R. Kinsey
*Attorney, Agent, or Firm*—Holman & Stern

[57] ABSTRACT

An agricultural rotary mower has a frame mountable upon the three point linkage of a tractor and the frame includes a rotor supporting beam which extends in its operating position to one side of the tractor. Dependent from the beam is a fixed spindle with a ground engaging skid at its lower end. A frusto-conical rotor with a plurality of peripheral cutting blades is rotatably mounted upon this spindle and is driven by a belt drive from a pulley on the frame operatively connected to the power take-off of the tractor to a pulley on top of the rotor.

3 Claims, 3 Drawing Figures

ROTARY MOWERS

This application is a continuation-in-part of our co-pending application Ser. No. 265,698, now abandoned, filed June 23, 1972 and entitled "Rotary Mowers".

BACKGROUND OF THE INVENTION

The present invention relates to agricultural rotary mowers.

PRIOR ART

The traditional implement for cutting grass or similar crops on the farm is the sickle-bar mower in which a bar carrying a plurality of triangular knives or sickles oscillates on a fixed bar shaped to correspond with the outline of the plurality of sickles. This implement is held parallel to the ground and has the advantage that it does not, when there are minor projections on the ground, cut into the soil. It has the disadvantages of being expensive in first cost and in maintenance, and the grass when cut is not directed by the cutters. A swath board following the cutters pushes all the cut grass to one side into a windrow. In it leaves and stems are intermingled and since the leaves dry faster than the stems, they are ready while the stems are still wet.

In a second type of mower flails, hinged blades that rotate about a vertical rotating spindle, are flung out by centrifugal action, and cut the crop. This implement scalps high spots of the ground and commonly cuts individual grass stems more than once so that the crop is chopped up.

A still further type of mower has drums, with vertical axes, in pairs (that is, two rotors, four, six or eight), each pair of which counter-rotate. This implement has provision under the rotors to eliminate scalping, and does not double-chop the crop, but needs some means of overlap or precision meeting of the blades so that an uncut strip is not left. This may be a synchronous drive (gears or chains) or other critical means. This type of mower is necessarily complicated and expensive. Also, rotors in pairs tend to generate resonating vibrations unless critically maintained in balance.

OBJECTS AND SUMMARY OF THE INVENTION

It is therefore an object of the present invention to provide an agricultural rotary mower which is comparatively simple in structure and operation, but is effective in a wide range of operating conditions.

It is a further object of the present invention to provide an agricultural rotary mower which is relatively simple to maintain.

It is a still further object of the present invention to provide an agricultural rotary mower with a rotor having a high peripheral speed so that, in use, the rotor will carry the cut grass partially supported thereon to a discharge point at one side with the cut stalks at the bottom of the crop caused to stop upon impact with the ground and the top continuing in motion resulting in the windrow as it forms rolling over with the stalks uppermost.

It is a yet further object of the present invention to provide an agricultural rotary mower which has the rotor movable between the operating position to one side of the tractor and a travelling position behind and substantially within the wheel base of the tractor.

The above stated and further objects will become more apparent with reference to the following description of one preferred embodiment of the invention.

DETAILED DESCRIPTION OF THE INVENTION

Figure 1:
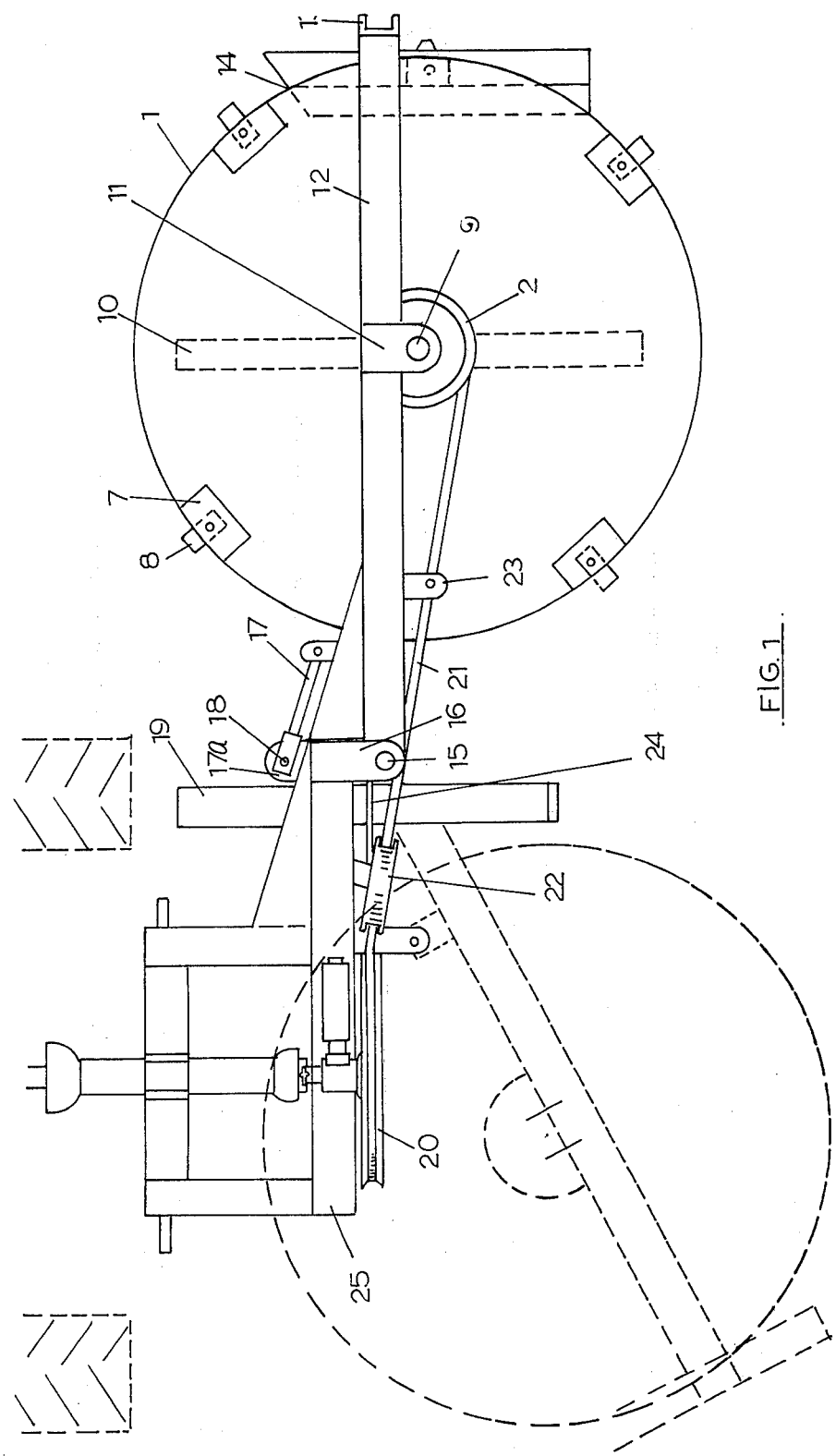
FIG. 1 is a diagrammatic plan view of the invention.
Figure 2:
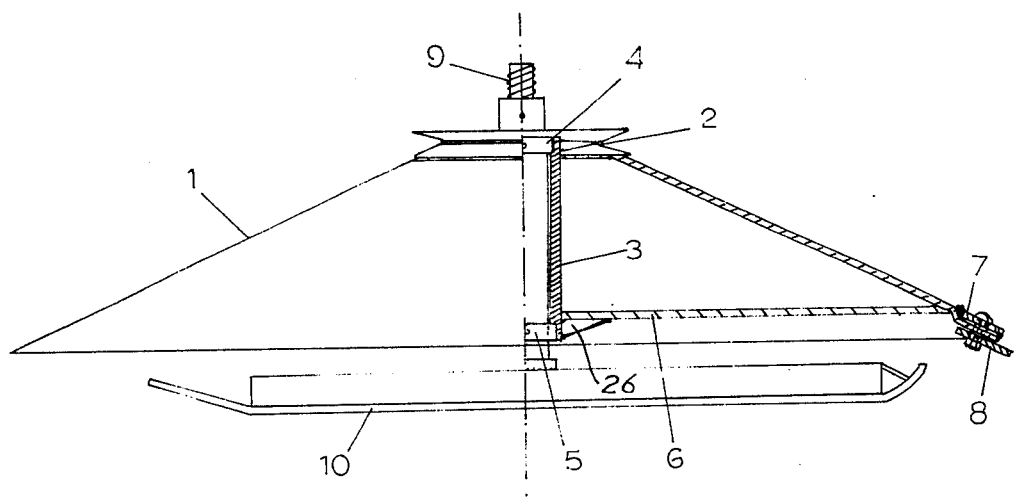
FIG. 2 shows a view partly in cross-section and partly in elevation of the rotor, spindle and skid
Figure 3:
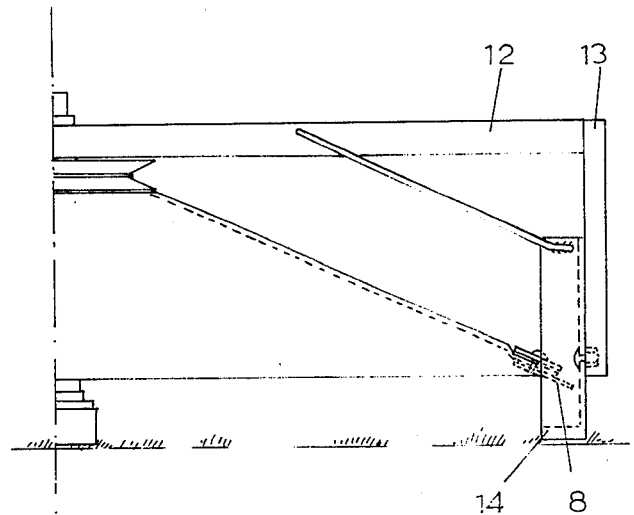
FIG. 3 shows the arrangement of the outboard skid.

In the preferred form of the invention sheet steel one eighth of an inch thick is formed into a frustrum of a cone 1 having a base diameter of sixty inches, a diameter at the top of twelve inches, and a height of ten inches. On the top and parallel to the base is affixed a pressed steel section V-pulley 2. Within the pulley and extending downwardly almost to the base is affixed a tube 3 supporting a bearing journal 4 and 5 at each end. This tube, near its bottom, is supported by a disc 6 of one eighth of an inch thick steel extending to the outer surface of the cone. A reinforcing gusset 26 helps to support the inner portions of the disc 6. At four equally spaced points around the outer diameter of the cone are affixed strengthening plates 7 curved to conform with the surface of the blade carrying rotor and welded thereto. The strengthening plates may, for example, be eight inches by four inches and are preferably formed of high tensile "T1" steel. These plates provide additional support for cutting blades 8. The blades 8 may be sickles or they may be any other cutter of choice, for example, rectangular blades being pivotally mounted and having the leading edge sharpened. Satisfactory cutting is obtained with blades one eighth of an inch thick, but blades thinner than this are found to be fragile.

The conical rotor 1 is supported by a fixed spindle 9 two inches in diameter and of an overall length of approximately fifteen inches, having on its bottom a head or long plate below the level of the cutting blades to act as a center skid 10. The skid 10 is welded to the lower end of the spindle 9 and may be any conveniently shaped skid, for example, with an upturned forward end being a length extending over the major portion of the diameter of the rotor, for example, fifty-four inches.

The spindle 9 is bolted into a bracket 11 on or otherwise affixed to a main beam 12 which is approximately four inches in the horizontal direction and approximately four inches in the vertical direction.

At the outer end, the main beam 12 supports a downwardly projecting vertical member 13 which reaches to the bottom level of the cutter and then leads downwardly and inwardly to support a skid 14 which bears on the ground within the swath cut by the cutter. The skid 14 is capable of adjustment in height by a modification to the vertical member 13.

The main beam 12 is approximately six feet long. At its inboard end, it is supported on a pivot 15 between the two members of a bracket 16, which is, in its turn, supported by a fixed or inboard part 25 of the main beam. This inboard or fixed part 25 is supported by means that will be readily understood from the tractor frame. Bracket 16 is within the line of advance of the tractor main wheels. When therefore the part 12 of the beam is swung around on the pivot 15 to the inboard position, which is shown dotted, nothing projects beyond the outer plane of the tractor's wheels.

When the beam 12 is in its working position, an arm 17 mates with a lug 17a mounted on the fixed or inboard part 25 of the main beam 12. They are held together by a shear pin 18. If the cutter mechanism meets considerable opposition to its advance, this pin will break and not the mechanism itself. Immediately inboard of the bracket 16, a downwardly projecting strut from the fixed part 25 supports an inner skid 19. The skid, is about two feet in the fore and aft direction, and about four inches athwart it. It is adjustable in height. The normal setting is such that the cutters are one and a half inches from the ground when the tractor is standing on a flat, hard surface.

A two foot diameter V-pulley 20 is mounted on the tractor take-off drive. A V-belt 21 passes from pulley 20 over an idler pulley 22 to a belt guide 23 and out to the V-pulley 2 on the dished cutting plate. Immediately inboard of the pulley 2, the belt passes through two guides (not shown) to discourage the belt from being thrown off.

The support 13 for the outer skid 14 can, if desired, be a small swath board.

The direction of the drive of the rotor 1 is towards the tractor at the front of the rotor. The crop as cut is therefore carried in towards the tractor (assisted by the inward movement of a forward run 24 of the driving belt) and back between the support of the inner skid 19 and the rotor 1. The crop is cut only once, since this carrying motion takes it away immediately from the cutting blades.

It has been found that, because the rotor is conical, smooth, large in diameter and rotating fast, it does not impart kinetic energy to the crop but acts merely as a frictionless guide. The crop, leaves and stalks equally, is given a velocity component at right angles to the line of travel more or less equivalent to the forward speed of the tractor, towards the delivery side of the rotor. As the sideways moving crop meets the ground, the cut stalks which are still at the bottom of the moving cut mass of crop, are caused to stop in the cross direction, but the tops tend to continue, causing the windrow as it forms to roll over so that the cut stalks are exhibited towards the sun, enabling them to dry more nearly in time with the drying of the leaves. The effect is very similar to that of a ploughshare in turning over ground.

What I claim is:

1. An agricultural rotary mower comprising:
   a. a primary frame,
   b. mounting means in said primary frame to engage the three point linkage assembly of a tractor,
   c. a rotor supporting beam supported from and extending to one side of said primary frame,
   d. a vertically fixed spindle dependent from said rotor supporting beam,
   e. a ground engaging skid at the end of said fixed spindle,
   f. a single blade transporting rotor comprising a frustoconical shell rotatably mounted upon said spindle, an inner strengthening disc towards the base of said frustoconical shell, a vertical central spindle receiving tube extending between the top of the shell and the disc, and bearing journals in said tube,
   g. a plurality of cutting blades attached to said rotor to project beyond the periphery thereof,
   h. a pulley driveably connected to the top of said blade supporting rotor,
   i. a pulley mounted in the primary frame,
   j. a belt drive between the pulley in the primary frame and the pulley in the top of the blade transporting rotor, and
   k. a drive shaft having one end operatively connected to the pulley on the primary frame and the other end engageable upon a power take-off of a tractor.

2. An agricultural rotary mower as claimed in claim 1 wherein strengthening plates of high tensile steel are welded to the frustro-conical shell to provide reinforced supports for the cutting blades.

3. An agricultural rotary mower as claimed in claim 2 wherein the height of the frustro-conical shell is approximately one sixth the base diameter thereof.

* * * * *